Figure 4:
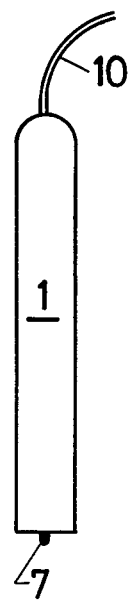

United States Patent [19]

Bruel

[11] 4,189,655
[45] Feb. 19, 1980

[54] LIGHTWEIGHT PIEZOELECTRIC ACCELEROMETER

[75] Inventor: Per V. Bruel, Rungsted Kyst, Denmark

[73] Assignee: Bruel & Kjaer Industri A/S, Naerum, Denmark

[21] Appl. No.: 896,185

[22] Filed: Apr. 14, 1978

[51] Int. Cl.² .......................................... H01L 41/10
[52] U.S. Cl. .................................. 310/329; 73/516 R
[58] Field of Search ................. 310/329; 340/17 R; 73/516 R, 517 R, 517 AV

[56] References Cited

U.S. PATENT DOCUMENTS

| 2,386,279 | 10/1945 | Tibbetts | 310/329 X |
| 3,252,016 | 5/1966 | Hayer, Jr. et al. | 310/329 |
| 3,311,761 | 3/1967 | Schloss | 310/329 |
| 3,631,271 | 12/1971 | Shimada | 310/329 X |
| 3,893,342 | 7/1975 | Florian et al. | 310/329 X |
| 3,911,388 | 10/1975 | Crump | 310/329 X |
| 4,030,396 | 6/1977 | Mariner | 310/329 X |

Primary Examiner—Mark O. Budd
Attorney, Agent, or Firm—Le Blanc, Nolan, Shur & Nies

[57] ABSTRACT

A lightweight accelerometer in a casing or housing, having a very small base member to mechanically contact a surface, vibrations of which are to be determined; a piezoelectric element connected to the base, a seismic mass connected to the piezoelectric element, at least one thin circular diaphragm peripherically fixed to the housing, and with the base, the piezoelectric element, and the seismic mass fixed on, and axially symmetric to, the center of diaphragm and a soft pad member on the housing providing support on and dynamically isolating the housing from the vibrating surface. Several embodiments are disclosed and in each embodiment vibrations are directly transmitted from the vibrating body or surface to the piezoelectric element through the base, a very small half of a steel sphere.

8 Claims, 5 Drawing Figures

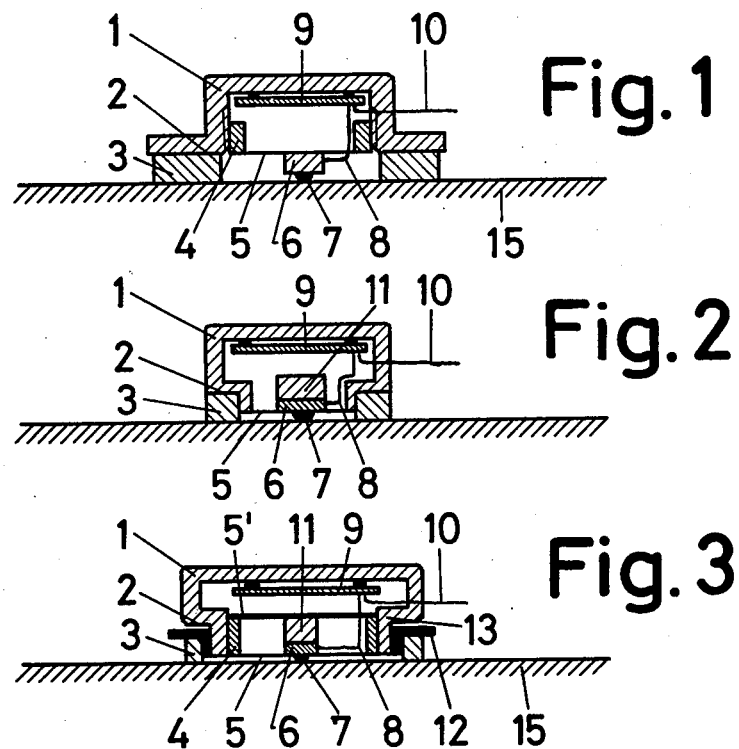

LIGHTWEIGHT PIEZOELECTRIC ACCELEROMETER

BACKGROUND OF THE INVENTION

The present invention relates to an accelerometer having a reasonable sensitivity at very elevated (ultrasonic) frequencies. The accelerometer in question comprises a housing which has a lower part in contact with the surface, the vibrations of which are to be determined, and a piezoelectric element associated with a seismic mass (inertial body). It is a purpose of the invention to provide an accelerometer having a predictable and hitherto unattained high sensitivity in the ultrasonic range of frequencies. It is a further purpose of the invention to provide an accelerometer which has a reduced sensitivity to transverse vibrations in the surface, the vibrations of which are to be measured.

It has been tried to cement the piezoelectric element directly to the vibrating surface and to cement the necessary seismic mass directly on top of the piezoelectric element. In this way an accelerometer of small weight has been obtained, which therefore is able to measure vibrations of relatively high frequencies. This simple solution is, however, not useable in practice since the vibrating surface always exhibits vibrations in several directions and not just perpendicular to the surface. The transverse vibrations in the surface develops spurious voltages in the piezoelectric elements. To avoid these, accelerometers having a very thick and stiff base have been constructed. Thus the bending of the surface to be measured will influence the piezoelectric element to a negligible extent only but instead the vibrating part of the accelerometer is made so heavy as to influence the vibrations to be measured, and furthermore the upper frequency limit is reduced appreciably. This is only acceptable when measuring low frequencies, e.g. in heavy machinery or buildings, but light constructions and high frequencies entail several difficulties. The light constructions are affected by the mass of the accelerometer, wherethrough the vibrations to be measured are distorted.

To preserve the upper frequency limit it is necessary at the same time to make the accelerometer small and therethrough light, and keeping a comparatively thick and stiff base which is heavy. A high resonance frequency is a prerequisite for high sensitivity at elevated frequencies since piezoelectric accelerometers can only be used below their resonance frequency. This would reguire the accelerometer to be of a low profile with a thin base, a thin piezoelectric element—everything contributing as little as possible to the mass. In this case, however, the sensitivity would suffer since it is proportional to the thickness of the piezoelectric disc and to the mass of the inertial body above it.

In particular when measuring acoustic emission where an indication of very high frequencies is desired, e.g. from 100 kHz to 2000 kHz, the problems are so severe that not only the base but also the seismic mass has to be entirely dispensed with. Accelerometers of this kind have been quite unable to perform a mesurement but can only give an indication of the occurence of vibrations.

Several designs of accelerometers have been published that try to avoid some of the problems outlined above, such as U.S. Pat. Nos. 3,145,311 and 3,394,586 and German Published Applications Nos. 1,005,758 and 1,228,448. Their size, however, gives rise to an error caused by the wavelength of the vibrations to be measured. At low frequencies where the wavelength is large compared to the dimensions of the accelerometer only errors caused by the bending of the base are present. At shorter wavelengths, from 2 to 5 times the dimensions of the accelerometer, an error is introduced, because some parts of the accelerometer are vibrating with a higher amplitude than others. At still shorter wavelengths some parts may vibrate in antiphase, thereby giving an indication of "little" or "no vibration". Another general difficulty in measuring vibrations of high frequency is coupling the vibrations from the vibrating surface to the accelerometer proper. The vibrations are to pass from the vibrating surface through the fixing means (e.g. cement, wax, threads, adhesive tape) to the base and through piezoelectric element to the seismic mass. Very often there exists an elasticity between the different layers which causes the seismic mass to vibrate differently from the vibrating surface. In particular, the contact between base and vibrating surface is critical and difficult. In other words: the correct fastening of the accelerometer is difficult to ensure. Even a threaded connection spanning polished surfaces may not be sufficient at the high frequencies involved.

It is a purpose of the invention to provide an accelerometer that does not suffer the disadvantages described above. This is obtained by dynamically isolating the accelerometer case from the vibrating surface, by carrying the base of the accelerometer, the piezoelectric element, and the seismic mass by one or a plurality of diaphragms which are peripherically fixed to the case.

Using the configuration described above makes possible both accurate control of the movements of the base perpendicular to the surface of the diaphragm and the sensing parts of the accelerometer become very light. The stiffness of the diaphragm causes a reduction of the accelerometer of ca. 10 times as compared to previously known accelerometers. As the diaphragm is fastened to to a case which is heavy as compared to the vibrating parts, this case may contain an amplifier and the necessary cable may be fastened to the case. This implies that the voltage sensitivity may be made quite normal—this depends upon the thickness of the piezoelectric element only but not upon it's area. When the area is small the capacity becomes small also and so necessitates an amplifier, and this is easily obtained in a construction according to the invention.

In one embodiment of the invention, the diaphragm is disposed between the base and the piezoelectric element. In this way it is made possible to weld the base of the accelerometer to a thin diaphragm.

In another embodiment of the invention, the piezoelectric element is disposed between the base and the diaphragm. This makes possible the use of the diaphragm's dynamic mass as a seismic mass, this serves to improve the useful upper range of the accelerometer.

In still another embodiment of the invention the base of the accelerometer is shaped as a spherical segment, e.g. obtained through the use of part of a steel sphere having a diameter of 1 millimeter and a height of 0.3 millimeter. Thus the contact area with the vibrating surface is made very small and the pressure similarly very large. In this way the base functions as if it were welded or brazed to the surface.

In still another embodiment of the invention the piezoelectric element and the seismic mass are disposed between two parallel diaphragms. Thus it is avoided that the assembly displays a rocking motion, thereby generating spurious signals.

In still another embodiment of the invention, the actual mechanical assembly is obtained by means of cement. This makes for an extremely lightweight construction ensuring a very high upper frequency limit.

In still another embodiment of the invention, the contact pressure between the base and the vibrating surface is so great that at least one of the contact surfaces suffers an elasic deformation. This contact pressure depends upon the weight of the accelerometer, on the resilience of the material that surrounds the base, and by the placement of the base in the case. By obtaining a sufficiently great pressure it is obtained that even high frequencies with associated high acceleration levels may be transmitted from the surface to the piezoelectric element without distortion.

In still another embodiment of the invention, the case on its underside carries a cushion of a flexible material, which cushion has a thickness such that the base of the accelerometer presses against the vibrating surface with a prescribed springiness and with a convex base. Thus it is obtained that the pressure of the base against the surface becomes a definite value which is mainly determined by the weight of the accelerometer minus a slight pressure from the cushion.

In still another embodiment of the invention, the convex base of the accelerometer projects freely from the underside of the case, so that the accelerometer may be held in one hand in contact with the vibrating surface. Thus it is obtained that one may manually increase the pressure of the base against the surface until a reliable contact has been obtained. This is a simple, inexpensive, and technically elegant solution.

In still another embodiment of the invention, the case of the accelerometer is fastened to an arm which is carried by a support that ensures that the base of the accelerometer is pressed against the vibrating surface with a prescribed force. This force is composed of the weight of the accelerometer and part of the arm, and furthermore, in case the arm is spring loaded, of a specific force exerted by the spring. Thus a fixed station for the accelerometer is obtained. This is desirable in case the accelerometer is to perform a series of measurements on essentially identical objects which may then be brought in contact with the base, one after the other.

Figure 5:
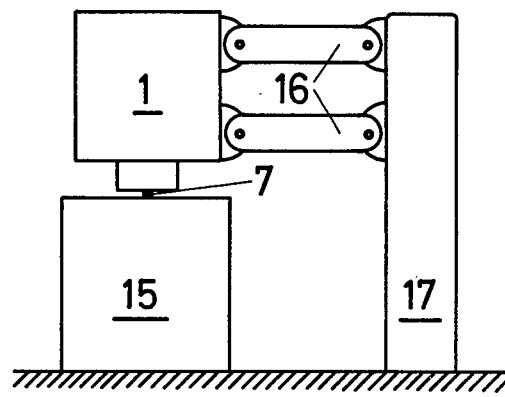

The invention will be further described with reference to the drawing, in which:

FIGS. 1, 2, and 3 show axial sections through three different embodiments of the invention, and FIGS. 4 and 5 show side views of two further embodiments of the invention.

The accelerometer, FIG. 1, is contained in a cylindrical case 1 with a flange 2 on the underside of which there is provided a circular cushion 3 of a light and resilient sponge rubber. A ring 4 with outside threads is screwed into an inside thread in the cylindrical part of the case 1. This ring 4 carries on its lower rim a diaphragm 5 which is made of a 0.1 millimeter thick beryllium foil. The inside diameter of the ring 4 is approx. 5 millimeters. Centrally on the underside of the diaphragm 5 a piezoelectric ceramic disc 6 has been cemented. On the underside of said disc 6 an accelerometer base 7 has been cemented, this is made of a segment of a steel sphere of 1 millimeter diameter, having a height of 0.3 millimeter. From the ceramic disc 6 a pair of conductors 8 lead to an amplifier 9 that is fixed below the top of the case 1. From the output of the amplifier 9 a cable 10 carries the output voltage of the amplifier to a measuring instrument, not shown. The cable 10 furthermore contains power supply leads for the amplifier 9.

The amplifier 9 may be fixed to the ring 4 instead of below the top of the case 1, in this case the wiring is simpler.

Another embodiment of the invention is shown on FIG. 2 which is different from FIG. 1 mainly in that the ceramic disc 6 is not fixed to the underside of the diaphragm 5 but instead on its topside, and in that the ceramic disc 6 carries a seismic mass 11. The base 7 of the accelerometer is welded directly to the underside of the diaphragm 5, e.g. by resistance welding. In this embodiment of the invention the wiring connecting the ceramic disc 6 to the amplifier 9 is simpler as the leads to not have to pass through a hole in the diaphragm 5.

In the embodiment of the invention displayed on FIG. 3, two diaphragms 5 and 5' are fixed to either end of the ring 4 and between these two diaphragms the ceramic disc 6 and the seismic mass 11 cemented to it are fixed. As in the previous embodiment described, the base 7 is welded to the underside of the lowermost diaphragm 5. In this embodiment an outer adjustment ring 12 has been provided, which ring is angular in cross section. Its cylindrical inner part is threaded and matches with an outside thread of a skirt 13 on the case 1. On the lower part of the ring 12 the cushion 3 is cemented, and the threads make its effective thickness adjustable so that one may regulate the pressure of the base 7 against the vibrating surface 15.

In the embodiment shown on FIG. 4 the case is oblong so that it is well suited for holding by the hand. The base 7 of the accelerometer is likewise oblong and is accesible under the case 1. The cable 10 exits at the top.

In the embodiment shown on FIG. 5 the case 1 is supported by the supoort 17 by means of an arm 16 thus creating a parallelogram. This support is designed for allowing automatic measuring of vibrating surfaces 15 on essentially idnetical objects.

It will be understood that the weight of the seismic mass 11 may vary within wide limits, through which provision the upper frequency limit of the accelerometer may be adjusted for any particular purpose, in particular the seismic mass may consist solely of the dynamic mass of the diaphragm or diaphragms and of the weight of the ceramic disc. Normally the case 1 will have sufficient weight to ensure sufficient pressure of the base 7 on the vibrating surface to maintain the contact. If this is not the case, then a weight may be put on top of the accelerometer which may then be made lighter itself.

It will furthermore be understood that the measurements and materials specified in connection with the explanation of the figures are in no way limiting for the scope of the invention. Furthermore the mentioning of the use of the accelerometer for measuring acoustic emission is not meant to restrict its use for that purpose. The reduction in mass of about 20 times that has been obtained according to the invention makes the accelerometer suitable for several applications, such as measurements of vibrations of hitherto unknown high frequency.

I claim:

1. An accelerometer housed in a casing having an opening, the combination comprising: diaphragm means including at least one thin circular diaphragm peripherally fixed to the casing across its opening; a small base means located on the exterior side of the diaphragm for mechanical contact with a surface, the mechanical vibrations of which are to be determined; a piezoelectric element; said piezoelectric element, said base means and said diaphragm being connected together with the piezoelectric element located between said base means and said diaphragm so that said diaphragm dynamic mass provides a seismic mass means and with the axis through the center of said diaphragm constituting an axis of symmetry through said seismic mass means, said piezoelectric element and said base means; and vibration absorber means on said case for mounting the case on the surface and dynamically isolating said case from the vibrating surface.

2. An accelerometer housed in a casing having an opening, the combination comprising: diaphragm means including at least one thin circular diaphragm peripherally fixed to the casing across its opening; a small base means located on the exterior side of the diaphragm for mechanical contact with a surface, the mechanical vibrations of which are to be determined; seismic mass means; a piezoelectric element; said seismic mass means, said piezoelectric element, said base means and said diaphragm being connected together with the piezoelectric element located between said base means and said seismic mass means and with the axis through the center of said diaphragm constituting an axis of symmetry through said seismic mass means, the piezoelectric element and said base means; and vibration absorber means on said case for mounting the case on the surface and dynamically isolating said case from the vibrating surface.

3. An accelerometer according to claim 2, in which the said diaphragm is disposed between said base means and said piezoelectric element.

4. An accelerometer according to claim 2, in which: said diaphragm means includes a second of said thin circular diaphragms peripherally fixed to the case, parallel and coaxial with and spaced from said first mentioned diaphragm; and said piezoelectric element and said seismic mass means are disposed between and interconnected with said two diaphragms.

5. An accelerometer according to claim 1, in which the relative fixing of said base means, diaphragm means and said piezoelectric element, is obtained by means of a cement.

6. An accelerometer according to claim 1, 2, 3 or 4 in which the base means is shaped as a spheric segment.

7. An accelerometer according to claim 2, 3 or 4 in which the relative fixing of said base means, diaphragm means, piezoelectric element, and seismic mass means is obtained by means of a cement.

8. An accelerometer according to claim 6, in which the mounting is such that the contact pressure between the base means of the accelerometer and the vibrating surface has a value that ensures that at least one of the two surfaces suffers an elastic deformation.

* * * * *

UNITED STATES PATENT AND TRADEMARK OFFICE
CERTIFICATE OF CORRECTION

PATENT NO. : 4,189,655
DATED : February 19, 1980
INVENTOR(S) : Per V. Bruel

It is certified that error appears in the above-identified patent and that said Letters Patent are hereby corrected as shown below:

On the title page insert [30] Foreign Application Priority Data
April 19, 1977          Denmark          1708/77

Column 1, line 50 "reguire" should read --require--.

Column 1, lines 61 and 62, "mesurement" should read
       --measurement--.

Column 2, line 31, "seismic mass" should read --seismic--.

Column 3, line 11, "elasic" should read --elastic--.

Column 4, line 18, "to", first occurrence, should read --do--.

Column 4, line 39, "supoort" should read --support--.

Column 4, line 42, "idnetical" should read --identical--.

Signed and Sealed this

Nineteenth Day of August 1980

[SEAL]

Attest:

SIDNEY A. DIAMOND

Attesting Officer

Commissioner of Patents and Trademarks